UNITED STATES PATENT OFFICE.

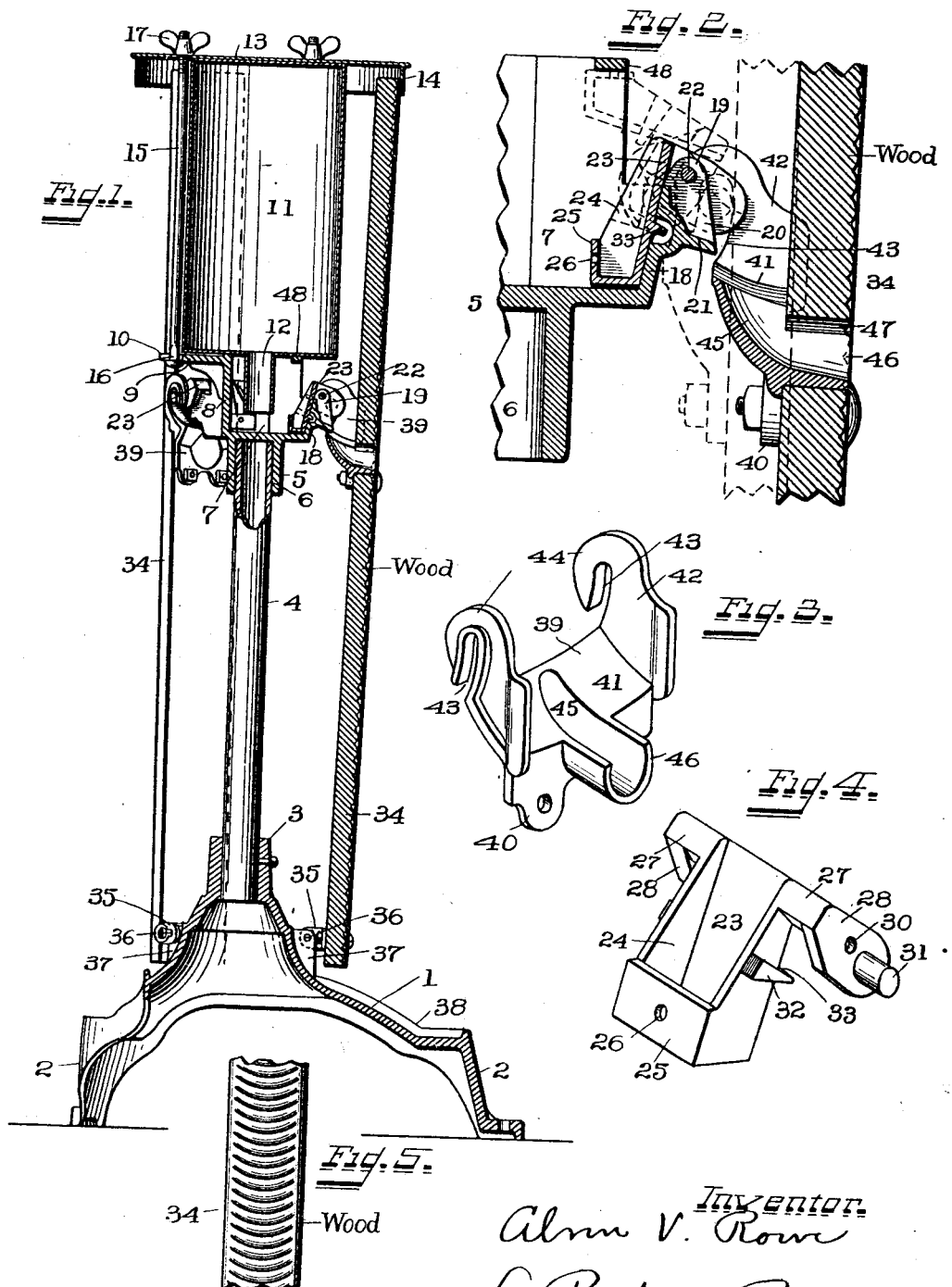
A. V. ROWE.
ANIMAL OILING DEVICE.
APPLICATION FILED APR. 7, 1915.
1,178,820.
Patented Apr. 11, 1916.

ALVIN V. ROWE, OF GALESBURG, ILLINOIS.

ANIMAL-OILING DEVICE.

1,178,820.  Specification of Letters Patent.  Patented Apr. 11, 1916.

Application filed April 7, 1915. Serial No. 19,638.

*To all whom it may concern:*

Be it known that I, ALVIN V. ROWE, a citizen of the United States, a resident of Galesburg, in the county of Knox and State of Illinois, have invented new and useful Improvements in Animal-Oiling Devices, of which the following is a specification.

My invention relates to improvements in animal oiling devices, and the object is to provide a device which is simple in construction and efficient in operation, for the application of oil or grease to the sides, back and body of the animal, by the rubbing action of the animal itself.

A further object is the provision in such a device, of means for supplying limited quantities of oil to the rubbing members upon the actuation thereof by the animal.

Further objects include the improvement of details of construction and arrangement hereinafter set forth.

To the accomplishment of the foregoing and such other objects as may hereinafter appear, my invention consists in the combination, construction and arrangement of parts hereinafter described, and then sought to be defined in the appended claims, reference being had to the accomanying drawings forming a part hereof, and which shows merely for the purpose of illustrative disclosure, a preferred embodiment of my invention, it being understood that various changes may be made in practice within the scope of the claims, without digressing from my inventive idea.

In the drawings:—Figure 1 represepts a longitudinal vertical section through a device constructed according to my invention; Fig. 2 represents a vertical section through part of the rubbing member, and the dipper or spoon members, showing the connections for operating the same and showing the operating position in dotted lines; Fig. 3 is a perspective view of the casting secured to the rubbing bar or member; Fig. 4 is a perspective view of the casting forming the dipper or spoon member, and Fig. 5 is an elevation of part of the rubbing member showing an advantageous form of corrugations.

It is found in practice in using rubbing devices having rubbing members composed of material of relatively high conductivity of heat and cold, that during the time of extreme heat or extreme cold, the animal will not operate the device. These rubbing members are usually metal, and when the temperature is high, they become exceedingly hot to the touch, and when the temperature is low, become correspondingly cold to the touch, and consequently, the animal shuns the device. It is one purpose, therefore, of this invention, to provide rubbing members of relatively low conductivity, so that they will not feel so cold or so hot to the animal when the temperature is extreme, and thereby materially adding to the utility of the device. I have found that wood serves this purpose the best, though it is obvious that other materials may be substituted therefor.

It is also a further purpose of this invention, to obviate the necessity of utilizing valves or springs to control the feed of the oil, and to supply the oil in limited quantities, or rather in charges, so that the animal by leaning against one of the rubbing members, cannot cause a continual discharge of the oil, thereby causing a great waste.

Referring now to the drawings, the numeral 1 designates the base, which is preferably provided with three legs or supports 2, having the central boss or stud 3 to receive the vertical stem or pipe 4, which extends upwardly therefrom, and on top of which is secured the casting or member 5. This casting or member 5 is of peculiar shape, having the boss 6 to receive the upper end of the stem or pipe 4 and also having the well 7 to receive the oil or other liquid from the supply reservoir. This well is provided by the upstanding side members 8 of the casting, which have the flat top or flange portions 9, the ends of which are recessed as at 10. These flat top or flange portions 9 form a bearing support for the supply reservoir 11 which has the discharge tube or nozzle 12, extending down into the well 7, as shown, so that a suitable level of the liquid is maintained in the well by air pressure, as is well understood. This supply reservoir or compartment is held in position by means of the top plate or cover 13, which has the depending flange 14 and through which passes the elongated securing bolts or rods 15 having the flattened end 16 engaging in the recessed portions 10 of the flat top or flange portions 9 of the casting 5, a thumb nut 17 being provided on top of the elongated rods or bolts 15, so as to hold the supply reservoir in position.

In addition to the upstanding side members 8 of the casing, I provide the alternating upstanding side members 18 which are interposed therebetween and are substantially half as high as said upstanding side members 8. These last mentioned side portions or members 18 are provided with the apertured ears 19 and are cut out as at 20 between said ears. This cut out portion has the inclined lower surface 21, the purpose of which will presently be described. These apertured ears 19 receive the pivot pin or bolt 22 on which the dipper or spoon members 23 are pivoted. This member 23 is shown in perspective in Fig. 4, where it is seen that it includes the dipper portion proper 24 having the short cover 25 with the aperture 26 therein. The arms 27 extend laterally from the front portion thereof, and have the depending side members 28 which are apertured as at 30 to receive the pin or bolt 22, and which have the studs 31 located therebelow, and projecting outwardly therefrom. The side members 28 form crank arms. Each dipper or spoon member 23 is provided with a rib 32 which extends around the sides and bottom thereof and is adapted to enter a corresponding groove 33 in the wall of the side member or portion 18 of the casting 5. These dipper or spoon members are adapted to be actuated by the animals, the actuating means including a rubbing member or bar and a connection between the rubbing member or bar and the spoon or dipper member. The rubbing member or bar is designated by the numeral 34 and is provided with the spaced and apertured ears 35 whereby it is pivotally secured as at 36, to the spaced and apertured ears 37 on the base 1. These rubbing members extend the full length of the device and their upper ends are positioned between the supply reservoir 11 and the depending flange 14 of the top or cover member. The preferable material for constructing these members is wood, which is of relatively low conductivity of heat and cold, and thereby far less disagreeable to the skin of the animal in extremes of temperature. Furthermore, this form of rubbing bar or member may be roughened or corrugated in various ways to assist in the rubbing action and the thorough application of the oil to the animal. An advantageous form of corrugation is shown in Fig. 5, that form being desirable as it directs the oil down the center of the rubbing members, so that there is no waste. It is to be noted that the base member is provided with channel portions 38 to receive the surplus oil.

At an intermediate portion on each rubbing member, I provide the casting 39, which is secured thereto by means of the apertured lugs 40. This casting has the dished or curved bottom portion 41 with the side members 42 which are spaced apart the width of the rubbing member or bar, and are provided with the downwardly curved slot 43 to form the hooks 44. It is these hooks that engage the studs 31 on the dipper or spoon members 23. Each of these castings is also provided with the depression or groove 45 leading to a discharge spout 46 which fits in an aperture 47 which is preferably centrally located on each of the rubbing members or bars, as shown and serves to feed the liquid to said rubbing bar.

In operation, the parts are in the position shown in Fig. 1 with a suitable supply of medicated liquid in the reservoir 11, a suitable level of this liquid is maintained in the well 7. When an animal rubs against one of the rubbing members 34, the rubbing member is moved on the pivot 36 at its lower end and due to the engagement of the studs 31 in the slots or recesses 43 of the casting 39 which is secured to the rubbing member, the dipper member 23 will be raised to the position indicated in dotted lines in Fig. 2, it being understood that the dipper member is pivoted at 22 so that the depending side members 28 have a crank or lever action. This dipper, of course, carries with it a small quantity of the liquid and discharges the same downwardly on to the curved or dished bottom portion 41 of the casting 39, from whence it flows through depression or groove 45 and spout 46 on to the outside face of the rubbing member and down along the rubbing member. Any drippings on the inside will be taken care of by the flange 32 and any drippings on the outside will fall on the inclined surface 21 of the side portions or members 18 and be discharged into the casting 39. The dipper member will retain the position shown in dotted lines in Fig. 2, until the pressure is removed from the rubbing member when it will drop to its normal position, due to the fact that the rubbing member will fall outwardly under the influence of gravity, as the pivot 36 is arranged so that the rubbing member cannot assume a perpendicular position, and it is not until the rubbing member moves to its outer position that it can be actuated to cause another charge of the liquid to be applied thereto. The upward movement of the dipper or spoon member 23 is limited by the abutment bar 48. This spoon or dipper member has the aperture 26 so that a supply of liquid may be admitted thereto, even when the level in the well is very low.

It is to be noted that I provide rubbing members which extend the full length of the device, so as to be adaptable for use by animals of various sizes, and thereby protecting the reservoir and the operating parts connected therewith from injury or damage by the animals, these rubbing members being corrugated or roughened, assist in the thorough application of the liquid to the bodies of the animals.

The connection between the rubbing members and dipper or spoon members for supplying the charge of liquid to the rubbing members, includes as stated before, a crank or lever movement, whereby the operation is accomplished simply and efficiently.

The device is composed of few parts readily assembled and will not get out of order easily. Its operation is efficient and the provision of the rubbing members of comparatively low conductivity of heat and cold, renders the device a material improvement in this art.

It is to be noted that the pivot 36 is formed by means of the cotter pin. This pivot is on a horizontal axis and is loose so that it permits a loose action at the lower end of the rubbing bar or member.

What I claim is:

1. A device of the character described, including in combination, a support, a supply reservoir mounted thereon, a well portion for receiving liquid from said reservoir, a plurality of rubbing members pivotally mounted on said support, dipper members positioned in said well, and connections between said rubbing members and said dipper members, whereby when pressure is applied to said rubbing members, the dipper members will discharge a quantity of liquid on said rubbing members, said connections including a lever arrangement.

2. A device of the character described, including in combination, a support, a supply reservoir mounted thereon, a plurality of rubbing members mounted on said support, a plurality of dipper members pivotally mounted and adapted to supply liquid from said reservoir to said rubbing members, having a pivotal connection with said rubbing members, said pivotal connections of said dipper members being so arranged so as to provide a lever construction so that when the rubbing members are actuated, the dipper members will supply liquid to said rubbing members.

3. A device of the character described including in combination, a support, a casting secured thereon having a well portion and having upstanding side members, a supply reservoir mounted on said upstanding members and having a spout positioned within said well portion, whereby a suitable quantity of liquid is maintained in said well portion, dipper members pivotally mounted on said casting, a plurality of rubbing members pivoted to said support and having a slidable and pivotal connection with said dipper members, whereby when said rubbing members are actuated, said dipper members will supply a limited quantity of liquid to said rubbing members.

4. A device of the character described, including in combination, a support, a casting secured thereon having a well portion and having upstanding side members, a supply reservoir mounted on said upstanding members and having a spout positioned within said well portion, whereby a suitable quantity of liquid is maintained in said well portion, dipper members pivotally mounted on said casting, a plurality of rubbing members pivoted to said support, said dipper members having depending side portions provided with laterally extending studs below the pivots of said members, said rubbing members having a slidable and pivotal connection with said studs whereby when said rubbing members are actuated, said dipper members will supply a limited quantity of liquid to said rubbing members.

5. A device of the character described, including in combination, a support, a casting secured thereon having a well portion and having upstanding side members, a supply reservoir mounted on said upstanding members and having a spout positioned within said well portion, whereby a suitable quantity of liquid is maintained in said well portion, dipper members pivotally mounted on said casting, a plurality of rubbing members pivoted to said support, said dipper members having depending side portions provided with laterally extending studs below the pivots of said members, said rubbing members having a casting secured thereto, said casting having a plurality of hooked portions with slots therein, said studs of said dipper members being positioned in said slots, whereby when said rubbing members are actuated, said dipper members will supply a limited quantity of liquid to said rubbing members.

6. A device of the character described, including in combination, a support, a supply reservoir mounted thereon, a plurality of rubbing members mounted thereon and each having an aperture provided centrally thereof, connections for delivering a limited quantity of liquid from said supply reservoir to said apertures when said rubbing members are actuated, said connections including the dipper members pivotally mounted and a casting secured to each of said rubbing members having a slidable and pivotal connection with said dipper members, said casting also having a grooved portion leading into said apertures.

7. A device of the character described, including in combination, a support, a supply reservoir mounted thereon, a plurality of rubbing members pivotally connected to said support, a plurality of dipper members pivotally mounted, said rubbing members having a pivotal connection with said dipper members, said pivotal connection for said rubbing members being so arranged that the rubbing members, normally assume under the influence of gravity, an outward position with the dipper members in a non-discharging and filling position, the dipper members being discharged when pressure is applied to the rubbing members.

8. A device of the character described, including in combination, a support, a casting mounted thereon, having a well portion, a supply reservoir supported on said casting and having a nozzle positioned in said well portion, a cover member positioned over said supply reservoir and having a depending annular edge flange, means for securing said cover to said casting, a plurality of rubbing members pivotally mounted on said support, and extending up to said cover member, their upper ends being positioned within said annular edge flange, and means connected with said rubbing members for delivering liquid thereto upon the application of pressure thereto.

9. A device of the character described including in combination, a support, a supply reservoir supported thereon, a plurality of dipper members adapted to discharge limited quantities of liquid from said supply reservoir, a plurality of rubbing members each mounted on a horizontal pivot on said support, so that their upper portions will swing inwardly or outwardly relative to said support, and having connections with said dipper members, whereby when pressure is applied to the rubbing members, the liquid will be delivered thereto.

10. A device of the character described, including in combination, a support having a source of liquid supply thereon, a rubbing member pivotally mounted on said support, a dipper member also pivotally mounted and adapted to be actuated by said rubbing member to transfer a limited quantity of liquid from the source of supply to said rubbing member, the pivotal mounting of said rubbing member being so arranged that it normally assumes an outward position under the influence of gravity, the dipper member being in a non-discharging and filling position, the rubbing member being adapted to be actuated by the pressure of an animal thereagainst to operate the dipper member.

11. A device of the character described, including in combination, a support having a supply reservoir thereon, a cover member positioned over said supply reservoir and having a depending annular edge flange, means for securing said cover to said support, a rubbing member pivotally mounted on said support, said pivotal mounting having a horizontal axis and being arranged so that a rubbing member normally assumes an outward position under the influence of gravity, said rubbing member extending upwardly to said cover member with its upper end positioned within said annular flange so that the annular flange limits its outward movement, and means operated by said rubbing member for delivering liquid thereto upon the application of pressure to said rubbing member.

12. A device of the character described including in combination, a supporting means having a source of oil supply thereon, a rubbing member movably mounted on said supporting means, a dipper member pivotally mounted and having a crank arm, said rubbing member having a hook connection with said crank arm whereby when the rubbing member is actuated by an animal leaning thereagainst, the dipper member will be actuated to transfer a limited quantity of liquid to said rubbing member.

13. A device of the character described including in combination, a supporting means having a source of oil supply thereon, a rubbing member movably mounted on said supporting means, a dipper member pivotally mounted and having a crank arm extending beyond said pivotal connection, said rubbing member having a hook adapted to engage said crank arm whereby when the rubbing member is actuated, the dipper member will be moved on its pivot to transfer a limited quantity of liquid to said rubbing member.

14. A device of the character described including in combination, a supporting means having a source of liquid supply thereon, a rubbing member movably mounted on said supporting means, a dipper member pivotally mounted and normally assuming a vertical non-discharge and filling position, connections between said dipper member and said rubbing member whereby when said rubbing member is actuated by an animal leaning thereagainst, said dipper member will be moved on its pivot so as to assume a discharge position to transfer a limited quantity of liquid to said rubbing member.

15. A device of the character described including in combination, a supporting means having a well portion thereon adapted to receive a supply of liquid, a rubbing member movably mounted on said supporting means, said well portion having a pair of spaced ears, a dipper member normally extending into said well portion and adapted to receive a limited quantity of liquid therefrom, said dipper member having crank arms, means for pivotally connecting said crank arms to said ears, said crank arms having laterally extending studs, said rubbing member having hook members adapted to engage said studs, whereby when the rubbing member is actuated, the dipper member will be moved to a discharge position to transfer a limited quantity of liquid to said rubbing member.

16. A device of the character described, including in combination, a support having a source of liquid supply thereon, a rubbing member movably mounted on said support, means for transferring a limited quantity of liquid from said source of supply to said rubbing member including a transfer member and an actuating member on said rubbing member adapted to engage said transfer member to actuate the same when said rubbing member is moved by the pressure of an animal thereagainst, said actuating member including means for directing the liquid from said transfer member on to said rubbing member.

17. A device of the character described, including in combination, a support having a source of liquid supply thereon, a rubbing member movably mounted on said support, means for transferring a limited quantity of liquid from said source of supply to said rubbing member, including a transfer member and an actuating member on said rubbing member adapted to engage said transfer member to actuate the same when said rubbing member is moved by the pressure of an animal thereagainst, said actuating member including a grooved portion extending through said rubbing member to direct the liquid from said transfer member on to said rubbing member.

ALVIN V. ROWE.